(12) United States Patent
Canney et al.

(10) Patent No.: US 12,154,139 B2
(45) Date of Patent: Nov. 26, 2024

(54) CONTEXTUAL TARGETING BASED ON METAVERSE MONITORING

(71) Applicant: Oracle International Corporation, Redwood Shores, CA (US)

(72) Inventors: Jason Canney, Highlands Ranch, CO (US); Frank Appiah, Greenwood Village, CO (US); Christopher Stark, Verona, NJ (US); John Orosa, Cambridge (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/310,930

(22) Filed: May 2, 2023

(65) Prior Publication Data

US 2024/0177196 A1 May 30, 2024

Related U.S. Application Data (60) Provisional application No. 63/385,536, filed on Nov. 30, 2022.

(51) Int. Cl.
*G06Q 30/0251* (2023.01)
*G06T 15/10* (2011.01)

(52) U.S. Cl.
CPC ..... *G06Q 30/0269* (2013.01); *G06Q 30/0254* (2013.01); *G06T 15/10* (2013.01)

(58) Field of Classification Search
None
See application file for complete search history.

(56) References Cited

U.S. PATENT DOCUMENTS

| | | | |
|---|---|---|---|
| 8,036,930 B2 | 10/2011 | Brignull et al. |
| 8,073,803 B2 | 12/2011 | Murdock et al. |
| 8,145,649 B2 | 3/2012 | Murdock et al. |
| 8,918,328 B2 | 12/2014 | Plachouras et al. |
| 9,378,632 B2 | 6/2016 | Venetianer et al. |
| 11,010,974 B2 | 5/2021 | Lashmar et al. |
| 11,260,299 B2 | 3/2022 | Badichi |
| 11,463,786 B2 | 10/2022 | Ray et al. |

(Continued)

OTHER PUBLICATIONS

Colormatics, "VR Advertising is Changing the Future of Marketing (Here's How)", retrieved from https://www.colormatics.com/article/vr-advertising-is-changing-the-future-of-marketing/, available on Aug. 30, 2022. (Year: 2022).*

(Continued)

*Primary Examiner* — Sam Refai
(74) *Attorney, Agent, or Firm* — Invoke (57) ABSTRACT

Systems are disclosed for determining contextual segments for targeting contextual advertising in metaverses. The system can deploy an observer avatar in a metaverse to capture information inside a portion of a metaverse from behaviors and interactions of a target user avatar. The observer avatar can capture audio, video, images, and text perceived by the observer avatar in the area of the user avatar, along with metadata describing the captured information. Using the captured observations, the system can determine contextual segments classifying the portion of the metaverse. Using a library of the contextual segments, advertisers can distribute contextually targeted advertisements.

26 Claims, 5 Drawing Sheets

(56) References Cited

U.S. PATENT DOCUMENTS

| | | | |
|---|---|---|---|
| 11,697,061 B2* | 7/2023 | Perry | A63F 13/5255 |
| | | | 463/31 |
| 11,856,272 B2 | 12/2023 | Ray et al. | |
| 2012/0306873 A1* | 12/2012 | Sharp | A63F 13/30 |
| | | | 345/419 |
| 2018/0059783 A1* | 3/2018 | van Hoff | H04N 21/4788 |
| 2022/0351281 A1* | 11/2022 | Morgan | H04L 51/02 |

OTHER PUBLICATIONS

"Anzu | Blended In-Game Advertising", Retrieved from https://www.anzu.io/, Retrieved on Mar. 15, 2023, pp. 9.

"The world's most advanced in-game advertising platform", Anzu, Retrieved from https://www.anzu.io/, Retrieved on Sep. 12, 2023, pp. 9.

* cited by examiner

CONTEXTUAL TARGETING BASED ON METAVERSE MONITORING

INCORPORATION BY REFERENCE; DISCLAIMER

The following application is hereby incorporated by reference: application no. 63/385,536, filed Nov. 30, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure generally relates to virtual environments, and more specifically, to targeting advertising within virtual environments.

BACKGROUND

Metaverses allow people to socialize and interact in virtual environments. A virtual environment is a computer-generated representation of a real-world environment. For example, a virtual environment can represent a city using three-dimensional (3-D) graphics to render interactive landscapes, flora, fauna, buildings, vehicles, and other objects. An avatar is an icon or figure graphically representing a user in a virtual environment. By manually controlling an avatar, a user can traverse the virtual environment and interact with other entities and objects.

Metaverses may also be inhabited by retailers offering goods and services. As with real-world retailers, virtual retailers may operate stores inside metaverses to generate revenue. For example, a metaverse can include a virtual automotive dealership that generates revenue selling virtual vehicles operable by avatars. The virtual dealership can also be associated with a real-world vehicle manufacturer. By doing so, the virtual dealership may generate additional revenue by presenting advertisements for the manufacturer, selling virtual vehicles representing the manufacturer's vehicles, referring customers to the manufacture's real-world dealerships, and even selling the manufacturer's real-world vehicles via the metaverse.

As metaverses evolve into the mainstream, many business are endeavoring to find effective techniques for placing advertisements inside virtual environments. Typically, advertisers place advertisements using behavioral targeting techniques that assume information about target users, such as identifiers, demographics, census data, and the like. However, behavioral targeting methods can be inaccurate and invasive of users' privacy.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

Embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The embodiments are illustrated by way of example and not by way of limitation in the figures of the accompanying drawings. References to "an" or "one" embodiment in this disclosure are not necessarily to the same embodiment, and they mean at least one.

This Detailed Description section includes the following subsections:
  A. GENERAL OVERVIEW
  B. ANALYTICS SYSTEM ENVIRONMENT
  C. SYSTEM ARCHITECTURE
  D. DETERMINING CONTEXTUAL INFORMATION IN A VIRTUAL UNIVERSE
  E. FIRST EXAMPLE OF DETERMINING CONTEXTUAL INFORMATION
  F. SECOND EXAMPLE OF DETERMINING CONTEXTUAL INFORMATION
  G. HARDWARE OVERVIEW
  H. MISCELLANEOUS; EXTENSIONS

A. General Overview

One or more embodiments monitor an avatar in a metaverse to select information to present to a target user that controls the avatar in the metaverse. The system deploys an observer avatar in a metaverse to capture information inside a portion of the metaverse from behaviors, visibility, and interactions of a target user avatar controlled by a target user. The observer avatar can be an active participant in the metaverse (e.g., an interactive avatar) or a passive observer (e.g., a non-interactive avatar or object). The observer avatar can capture, for example, audio, video, images, and text perceived by the observer avatar in the area of the user avatar, along with metadata describing the captured information (e.g., time, location, usernames, and the like). As an alternate to or in addition to the observer avatar, an application hosting the metaverse may capture the information used for building the profile for the target user. The system uses the captured information to build a profile for a target user that controls the user avatar. The profile may include, for example, actions or behaviors by the target user avatar within the metaverse, characteristics of environments explored by the target user avatar in the metaverse, or characteristics of other avatars with which the target user avatar interacted. The profile for the target user may then be used to select advertisement and marketing material for presenting to the target user. The advertisement or marketing material may be presented to the target user by placement of the material in an environment of the metaverse being explored by the target user avatar. The advertisement or marketing material may also be presented to the target user via different communication channels external to the metaverse.

One or more embodiments use the information captured by the observer avatar for targeting contextual advertising in metaverses. Contextual targeting is a technique for placing advertisements based on the content consumed on the media channel. An analytic system can determine contextual segments classifying the portion of the metaverse based on the captured information. Using a library of the contextual segments, advertisers can distribute contextually targeted advertisements to the target user.

In a non-limiting example, a user can control an avatar to move through a metaverse representing an urban environment. While traversing the environment, the avatar can interact with entities, objects, and other avatars. During the interactions, the avatar can move inside a virtual vehicle dealership, which may be a sub-environment of the urban environment. The interior of the dealership can be a virtualized 3-D representation of a real-world dealership, including vehicles, salespeople, furniture, static advertising displays (e.g., posters), and dynamic advertising displays (e.g., videos), etc. In response to the avatar entering the virtual environment or the sub-environment (e.g., the dealership), an analytics system can monitor the avatar's behavior, visibility, and interactions. Some embodiments instantiate an observer avatar that targets the user avatar for monitoring. The observer avatar can be substantially any virtual entity or object in the environment, including for example, an avatar (e.g., a salesperson), a vehicle (e.g., a vehicle), an animal (e.g., a dog), or a decorative object (e.g., a poster). Alternatively, the observer avatar can be an entity lacking any graphical representation, such an invisible avatar or an avatar comprising a single pixel. The observer avatar can capture observations (e.g., images, video, audio, and text) related to the user avatar's behaviors, visibility, and interactions and communicate the observations to an analytics system. The analytics system can digest the observations to generate computer-readable information. For example, using artificial intelligence, text-to-speech, and image recognition techniques, the analytics system can extract computer-readable information from the various types of data included in the observation information. By filtering the extracted information, the analytics system can identify relevant information and events for generating contextual segments classifying the dealership using predefined descriptors. (e.g., rugged, vehicle, off-road, etc.). The contextual segments can be stored in a library accessible by advertisers to determine contextual advertisements targeting the user. Based on the contextual segments, the analytics system can contextually target offers for goods and/or services.

While this General Overview subsection describes various example embodiments, it should be understood that one or more embodiments described in this Specification or recited in the claims may not be included in this subsection.

B. System Environment

Figure 1:
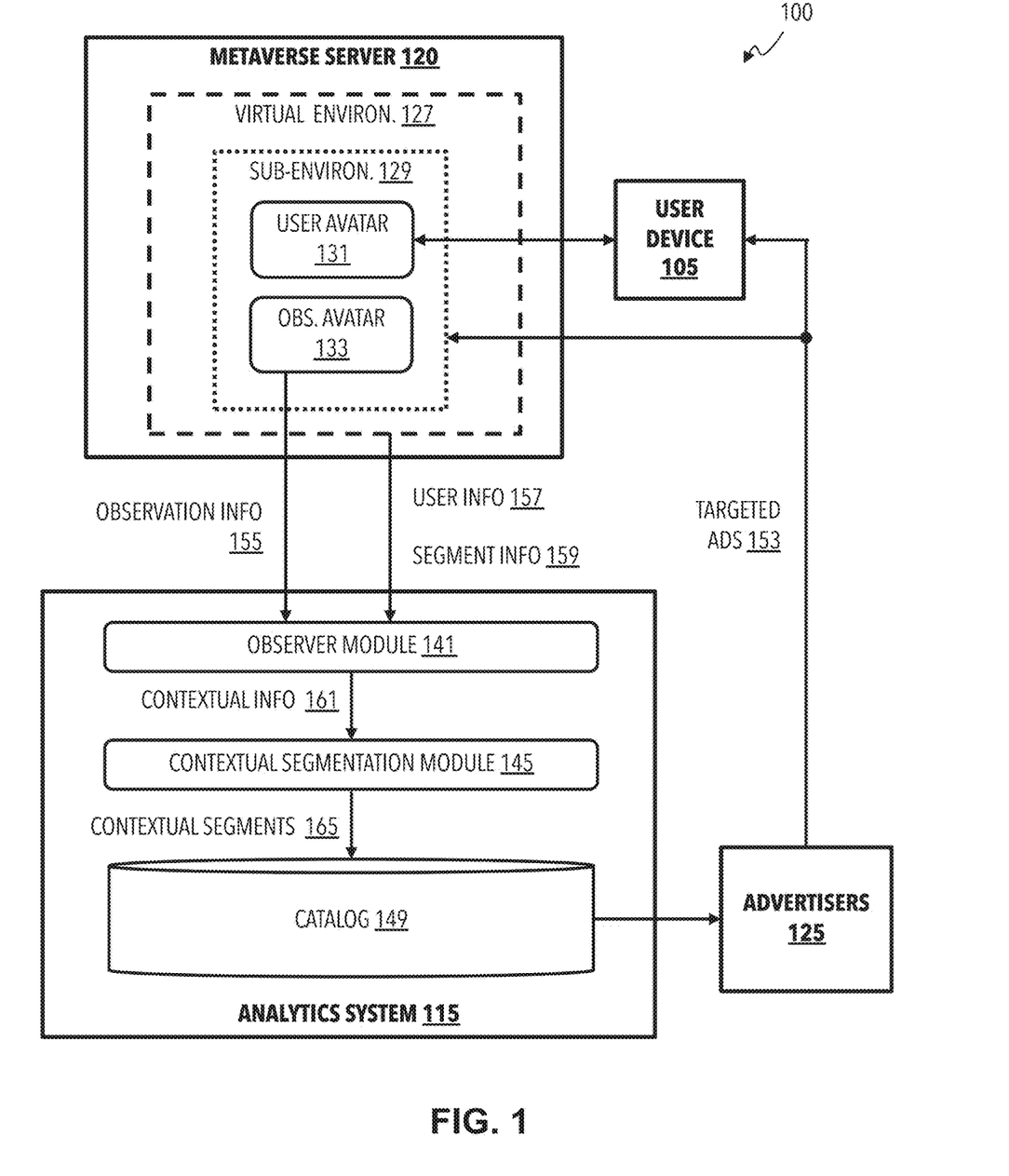
FIG. 1 illustrates a functional flow block diagram of an example system environment in accordance with one or more embodiments.

FIG. 1 shows a system block diagram illustrating an example of a computing environment 100 for implementing systems and processes in accordance with one or more embodiments. The computing environment 100 includes one or more user devices 105, an analytics system 115, a metaverse server 120, and advertisers 125, which can be communicatively connected, directly or indirectly via one or more communication links. The communication links can be wired and/or wireless information communication channels, such as the Internet, an intranet, an Ethernet network, a wireline network, a wireless network, a mobile communications network, and/or another communication network.

The metaverse server 120 can be one or more computing devices that generate and manage one more virtual environments 127. The metaverse server 120 can generate content representing virtual environments 127 and facilitate interactions, such as interactions between avatars, objects, entities, and the like. Also, the metaverse server 120 can receive and process control inputs for controlling a user avatar 131 and an observer avatar 133 in the virtual environment 127.

The virtual environment 127 can include one or more virtual sub-environments 129. A sub-environment 129 can be a portion or area of the virtual environment 127. Different sub-environments 129 within the virtual environment 127 can have different themes. For example, a virtual environment 127 representing an urban setting can include a first sub-environment representing a vehicle dealership and a second sub-environment representing a coffee shop. It is understood that the themes are not limited to shops offering products and service. Instead, sub-environment 127 can be any subset of the virtual environment 127 distinguishable by, for example: historical time periods (prehistoric, medieval, renaissance, contemporary, future, etc.), locations (e.g., planets, countries, cities, etc.), thematic genres (adventure, science fiction, noir, wargames, etc.), purpose (e.g., sports, home improvement, social networking, photography, etc.), and the like. Additionally, different environments 127 and sub-environments 129 can have different cost and fee structures, such as subscription-based fee or advertisement-supported fees.

A user device 105 can be one or more computing devices communicatively linked with the metaverse server 120 for interacting with the virtual environment 127. For example, the user device 105 can be a personal computer, workstation, server, mobile device, mobile phone, tablet device, and/or other processing device capable of implementing and/or executing software, applications, etc. The user device 105 can generate a computer-user interface enabling a user to access, perceive, and interact with the virtual environment 127 via the user avatar 131 using input/output devices. For example, the user device 105 can include a metaverse client that presents content and facilitates user interaction with the virtual environment 127. The metaverse client can exchange data (e.g., user input, content, etc.) with the metaverse server 120, render 3D graphics, and perform other tasks for facilitating interactions in the virtual environment 127 via the user avatar 131.

The analytics system 115 can be one or more computing devices communicatively linked with the metaverse server 120 for capturing observation information 155 and determining contextual information 161 from the observation information 155. One or more embodiments of the analytics system 115 include an observer module 141 and contextual segmentation module 145, and a catalog 149.

The observer module 141 can be software that monitors the virtual environment 127, and instantiates and controls the observer avatar 133 in the virtual environment 127. Additionally, the observer module 141 can capture observation information 155 from the observer avatar 133 in the virtual environment 127. The observer avatar 133 can be an active participant (e.g., a character) in virtual environment 127 or passively observe the virtual environment 127. The observer avatar 133 can observe the user avatar's 131 actions, behaviors, visibility, and interactions within the virtual environment 127, such as sub-environments 129 visited, and conversations and interactions with avatars of other users. The observer avatar 133 can capture observation information 155 including, for example, audio, video, images, and text perceived in the area of the user avatar 131, along with metadata describing the observation information 155. Using the observation information 155, the analytic system 115 can contextually classify the virtual sub-environment 129 for selecting advertisements for user that are presented within the virtual environment 127 (e.g., by a video, poster, or another avatar) or outside of virtual environment via other mediums (e.g., transmitted by email or pushed to the metaverse client). While the observer module 141 is described above as instantiating the observer avatar 133, one or more embodiments of the observer module can obtain observation information 155 from information of the user avatar 131 and the sub-environment 129 from the metaverse server 120 without instantiating the observer avatar 133.

The observer module 141 can also obtain user information 157 and segment information 159 from the virtual environment 127. The provider or manager of the virtual environment 127 can share descriptive and contextual information of a user of the user avatar 131 and of the sub-environments 129. The user information 157 can include identification and contact information of the user, such as a username, metaverse client identifier, email address, Internet protocol address, and unique identifier of the user device 105. The segment information 159 can include predetermined contextual segmentation information and demographic information describing the sub-environment 129. For example, if the sub-environment 129 represents a ski resort and the operator was intentionally targeting a demographic, the operator could provide the observer module 141 with contextual segments including "skier." "winter." "winter clothing." and "age 18-30."

The observer module 141 can process the observation information 155 to interpret the captured image, video, and sound information. For example, the observer module 141 can include artificial intelligence models trained to translate speech-to-text, to identify objects in videos and images, and to identify behaviors.

The contextual segmentation module 145 can be software that determines contextual segments 165 from the contextual information 161 generated by the observer module 141 and stores the contextual segments 165 in the catalog 149. The contextual segments 165 can be predefined keywords describing categories of products or services based on, for example, the "Big Five Dimensions" (i.e., activity, aggressiveness, responsibility, emotionality, and simplicity). For example, if the sub-environment 129 is a race track with very aggressive language, derived contextual segments could be "auto enthusiast" and "rugged." And, if the metaverse area is remodeling a home and the metaverse virtual people are speaking about a home design principle known as "feng shui," which focuses on positive energy, the contextual segments could be "home design" and "spiritual."

The catalog 149 can be a computer-readable storage device storing a database of the contextual segments determined by the contextual segmentation module 145. The advertisers 125 can access the contextual segments in the catalog 149 to analyze the contextual segments stored in catalog 149 for targeting advertisements 153. The targeted advertisements 153 can be displayed in the virtual environment 127, e.g., on a billboard or the like. The targeted advertisements 153 can also be transmitted to a user, e.g., at the user device 105. For example, the advertisers 125 can direct emails or generate advertisements 153 in the metaverse client. For advertisements 153 in a virtual environment 127, the advertisers 125 can direct images or videos to a virtual billboard or the like.

C. System Architecture

Figure 2:
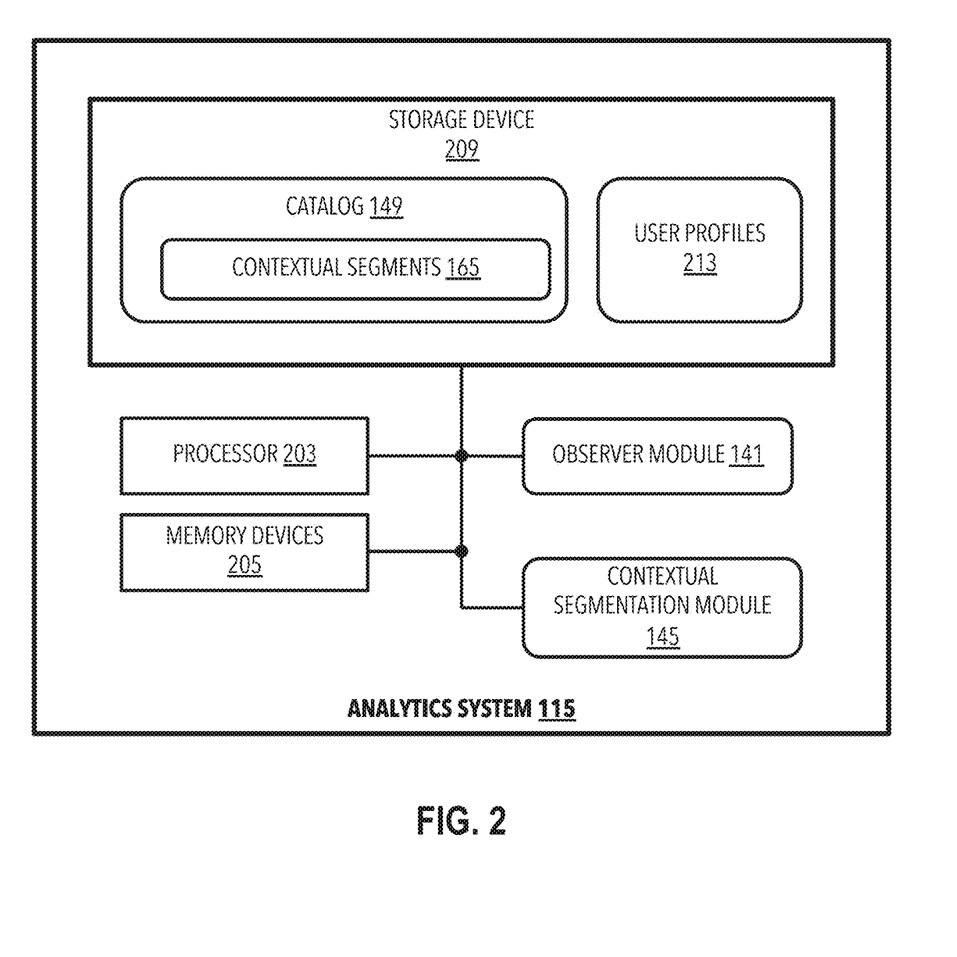
FIG. 2 illustrates a block diagram of an example analytics system in accordance with one or more embodiments.

FIG. 2 shows a system block diagram illustrating an example of an analytics system 115 including hardware and software that perform the processes and functions in accordance with one or more embodiments. The analytics system 115 can be the same or similar to that described above. Embodiments of the analytics system 115 can include a processor 203, one or more memory devices 205, and a non-transitory computer-readable storage device 209. The processor 203 can be one or more general-purpose processors, special-purpose processors, or other programmable data processing apparatuses providing the functionality and operations detailed herein. The memory device 205 and storage device 209 can be operatively and/or communicatively connected to the processor 203. In some implementations, the memory device 205 and/or the storage device 209 includes one or more types of memory structures. For example, the memory structures can include random access memory (RAMs) units, read only memory (ROMs), flash memory (e.g., solid state drives (SSDs)), electrically erasable/programmable read only memory (EEPROMs), etc. It should be appreciated that communication between the memory device 205, the storage device 209, and the processor 203 or another controller, encompasses the processor or controller accessing the memory device 205 and/or the storage device 209, exchanging data with the memory device 205 and/or the storage device 209 (e.g., reading/writing data to the memory device 205), or storing data to the memory device 205 and/or the storage device 209.

The storage device 209 can store a catalog 149, which can be the same or similar to that previously described above. The storage device 209 can also store user profiles 213 including information identifying user avatars (e.g., user avatar 131) and operator of the user avatar (e.g., a user of the user device 105), such as usernames and contact information. The user profiles 213 can also include information describing actions or behaviors by a target user avatar within the metaverse, characteristics of environments explored by the target user avatar in the metaverse, or characteristics of other avatars with which the target user avatar interacted. The user profiles 213 can also include information describing past actions taken by users to engage in purchase activity and interests in topics previously expressed by the users. The user profiles 231 can further include profile information, such as spending habits, e-commerce purchases, interests/hobbies, etc., of users outside of a virtual environment.

The processor 203 can also execute computer-readable program instructions of an observer module 141 and a contextual segmentation module 145, each of which can be the same or similar to those previously described above. It is understood that functionality of one or more of the of the observer module 141 and a contextual segmentation module 145 can be combined into a common software module and/or divided between additional modules.

The analytics system 115 can comprise any general-purpose computing article of manufacture capable of executing computer program instructions installed thereon (e.g., a personal computer, server, etc.). However, the analytics system 115 is only representative of various possible equivalent-computing devices that can perform the processes described herein. To this extent, in embodiments, the functionality provided by the analytics system 115 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Multiple components may be combined into one application and/or machine. Operations described with respect to one component may instead be performed by another component.

D. Determining Contextual Information in a Virtual Universe

Figure 3:
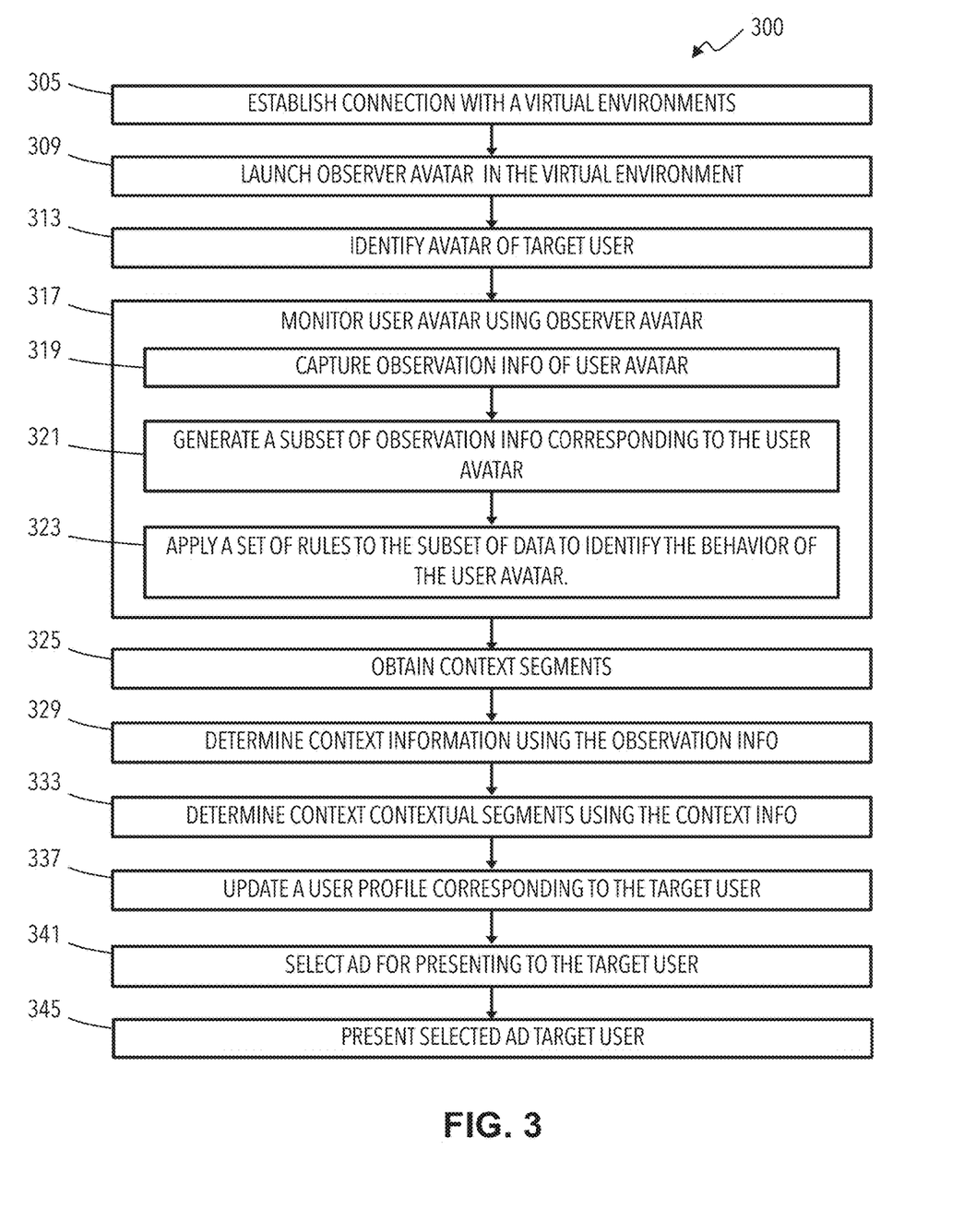
FIG. 3 illustrates a set of operations of an example process for determining contextual information for targeting contextual advertising in accordance with one or more embodiments.

The flow diagram in FIG. 3 illustrates functionality and operations of systems, devices, processes, and computer program products according to various implementations of the present disclosure. Each block in FIG. 3 can represent a module, segment, or portion of program instructions, which includes one or more computer executable instructions for implementing the illustrated functions and operations. In some implementations, the functions and/or operations illustrated in a particular block of the flow diagrams can occur out of the order shown in FIG. 3. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. Each block of the flow diagrams and combinations of blocks in the flow diagrams can be implemented by special-purpose hardware-based systems that perform the specified functions or acts, or combinations of special-purpose hardware and computer instructions.

FIG. 3 illustrates an example process 300 for determining contextual segment information for targeting contextual advertising. At block 305, an advertising analytics system (e.g., analytics system 115) can establish a connection with a metaverse (e.g., metaverse server 120) for collecting information to determine contextual segments describing areas (virtual sub environments 129) of a virtual environment (e.g., virtual environment 127). At block 309, the system (e.g., executing observer module 141) can instantiate an observer avatar (e.g., observer avatar 133) in the virtual environment. Instantiating the observer avatar can include logging into the virtual environment with the observer avatar and establishing a presence at or near a location of a user avatar (e.g., user avatar 131). One or more embodiments can instantiate the observer avatar at a location in response to a target user controlling (e.g., using user device 105) the user avatar to enter a sub-environment of a virtual environment. For example, the system can instantiate the observer avatar in response to the user avatar crossing an entry or other threshold of a virtual storefront within an urban environment.

At block 313, the system can identify the user avatar of a target user. Identifying the avatar can include locating and tracking the position of the user avatar in the virtual environment. One or more embodiments locate and track the user avatar based on a username or other identifier detected, for example, when the user avatar crossed the entry or other threshold of a virtual storefront. Identifying the user avatar can also include obtaining information of the target user, such as contact information, internet protocol address of the user device, a unique identifier of the user device, or the like. The system can store (e.g., in user profiles 213) the identifying information of the user avatar and the target user for later reference.

At block 317, the system can monitor the user avatar in the virtual environment. Some embodiments monitor the user avatar using the observer avatar. The monitoring can include, at block 319, capturing observation information of the user avatar. The observation information can include images, video, and audio perceivable by the observer avatar in the virtual environment. The viewpoint of the monitoring can be established from a view observing the target avatar (e.g., a second person view); from substantially the same view of as the target avatar (e.g., a first person view), and a 360 degree view surrounding the target avatar (e.g., a bird's eye view).

Capturing the observation information can also include, at block 321, generating a subset of the observation information to isolate information corresponding to the user avatar from other information that may be captured in the observation information. Generating the subsets can include filtering the audio and/or visual data to derive information related to the user avatar's movements and interaction. The data can be filtered, based on, for example, loudness, direction, and distance in relation to the observer avatar or the user avatar. For example, the system can filter out sounds emanating from entities outside a predetermined range (e.g., two meters) or sounds having a volume a predetermined amount below a predetermined volume, such as the user avatar's predetermined speaking volume within one meter. Additionally, the system can filter sounds, images, and video outside a current view of the observer avatar or the user avatar rendered by the system (e.g., a 120 degree arc with respect to the eyepoint) and beyond a predetermined range in the rendered view (e.g., three meters).

Capturing the observation information can also include, at block 323, applying a set of rules to the subset of data determined at block 321 to identify behaviors of the user avatar. Identifying behaviors can include identifying interactions and collisions with other avatars (e.g., touch, trade, and speech) and with objects (touch, move, and take). The rules can be based on combinations of proximity and audiovisual information. For example, if a user avatar and another avatar were located within two meters and audiovisual data indicates both avatars were speaking, a rule can infer the user avatar and the other avatar were speaking to each other. One or more embodiments identify behaviors using intelligent surveillance techniques that automatically detect, track, record, and analyze targets in a scene. For example, the surveillance techniques can use Markov logic network-based decision systems that recognize complex events in videos. By employing Markov logic networks, embodiments can merge information about tracked entities in a scene (e.g., avatars, non-player characters, and objects) using a multi-level inference process to identify complex events and interactions.

At block 325, the system (e.g., executing observer module 141) can obtain segment information (e.g., segment information 159) from the virtual environment describing the context of the sub-environment. Segment information can comply with a predefined dictionary of content segment classifiers. For example, if the sub-environment is a skiing equipment store in a ski resort environment, the segment information can include, for example: including "skier," "winter," "winter clothing," and "males/females 18-30", and the like.

At block 329, the system can determine context information from the observation information processed at block 317. Obtaining the context information can include using artificial intelligence, text-to-speech techniques, and image recognition techniques to determine computer-readable information from the various types of data (e.g., images, video, and audio) included in the filtered observation information determined at block 321. For example, if the sub-environment is a skiing equipment store, terminology extracted from the imager and video of the observation information can include, "skis," "pole" "slope," "sale," "boots," "jackets," "hats," "lift," "tickets," "Colorado," "Vail," etc. Additionally, terminology extracted from audio of the target avatar's conversation with another avatar can include "Vail," "February," "snowboard," "crushed," and "slope."

At block 333, the system (e.g., executing contextual segmentation module 145) can determine contextual segments (e.g., contextual segments 165) using the behavior information determined at block 323 and the contextual information determined at block 329. Determining the contextual segments can include classifying the behavior information and contextual information based on a predefined dictionary of contextual segments. The contextual segments can describe classes, such as "sports," "winter," "aggressive" and "travel." Some embodiments map the contextual information to the contextual segments using predefined rules. Some other embodiments classify the contextual information into contextual segments using a trained machine learning model. The server can store the contextual segments determined at block 333 in a library (e.g., contextual segments 165).

At block 337, the system can update the user profile corresponding to the target user to include the contextual segments determined at block 333. The user profile can be updated to include the actions or behaviors of the target user avatar determined at block 323. The user profile can also be updated to include characteristics of environments explored by the target user avatar in the metaverse or characteristics of other avatars with which the target user avatar interacted determined at blocks 325, 329, and 333. At block 341, the system can select advertisements for presentation to the user based on the information in the user profile. At block 345, the system can present the selected advertisements to the target user. Presenting the advertisement to the target user can comprise presenting the advertisement within the virtual reality environment to the first avatar controlled by the target user, transmitting the advertisement to the metaverse application hosting the sub-environment for the application to present the advertisement, and using a second avatar to present the advertisement to the user avatar. Presenting the advertisement to the target user may include presenting the advertisement to the target user via another communication channel (e.g., mail, email, text) that is external to the metaverse.

E. First Example of Determining Contextual Information in a Virtual Universe

Figure 4:
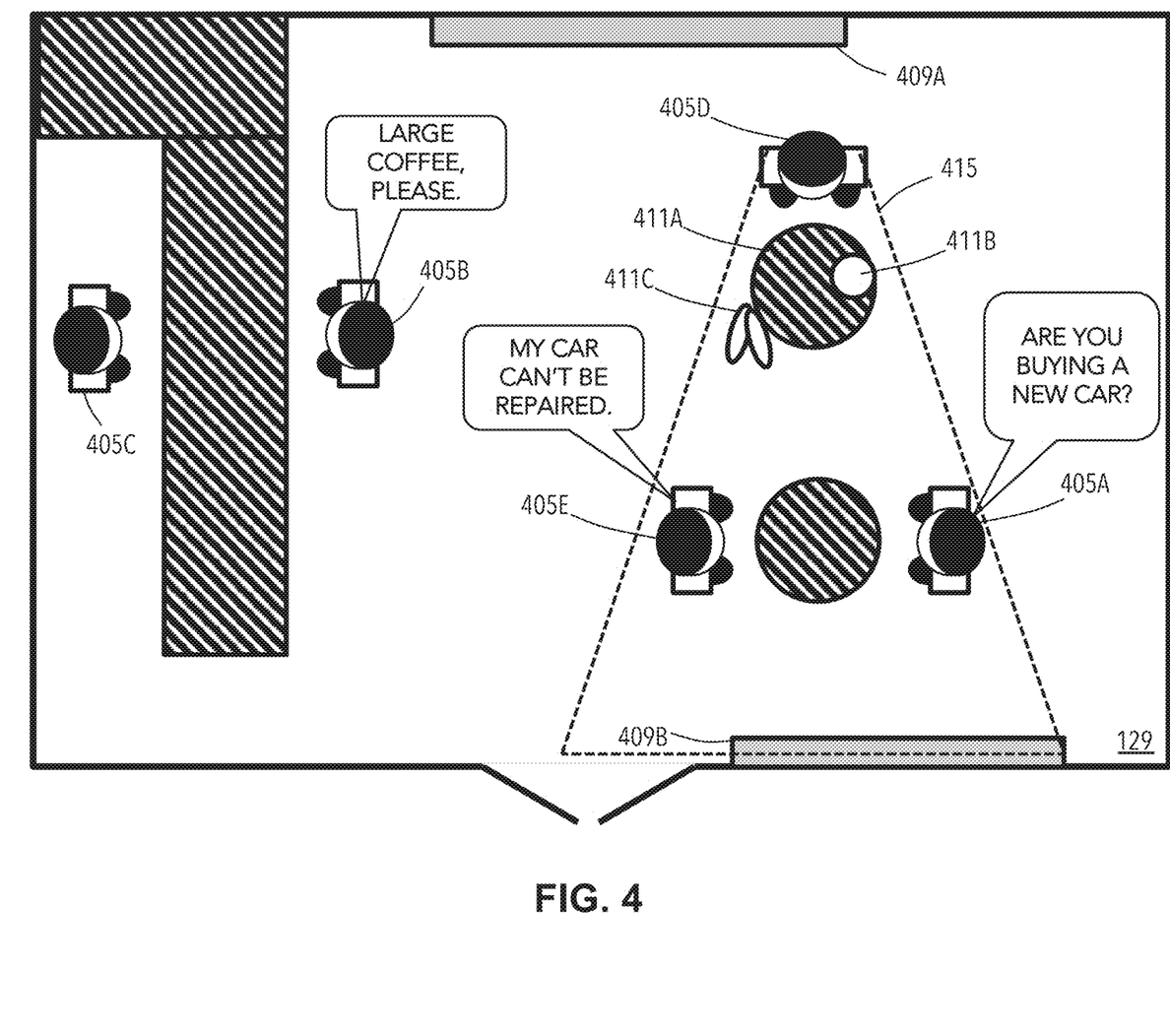
FIG. 4 illustrates an example embodiment of determining information for targeting contextual advertising in a virtual environment in accordance with one or more embodiments.

FIG. 4 illustrates an example embodiment of determining contextual segment information for targeting contextual advertising in a virtual sub-environment 129. The example sub-environment 129 can be the same or similar to those discussed above. The sub-environment 129 can be a virtualized representation of an upscale coffee shop, including interactive virtual entities 405A, 405B, 405C, and advertising objects 409A, 409B. The entities 405A, 405B, 405C can avatars of users or automatons (e.g., non-player characters). The advertising objects 409A, 409B can be a virtual billboard, poster, or other display configured to display advertising as static images or video.

As detailed above, an analytics system (e.g., analytics system 115) can instantiate the observer avatar entity 405D (e.g., observer avatar 133) in the sub-environment 129 in response to a target user controlling the user avatar entity 405E (e.g., user avatar 131) to enter the coffee shop. While the user avatar entity 405E is in the sub-environment, the observer avatar entity 405D can monitor the user avatar 405E by capturing information of the user avatar entity 405E, such as images, video, text, and audio perceivable by the observer avatar 405E in the virtual sub-environment 129. The analytics system can capture information from a viewpoint of the observer avatar 405E from a first person view of the observer avatar 405D, such as the user avatar's 405E interactions and behaviors.

As described above, the observation information captured can be subset of the information available in the sub-environment 129 that pertains to the user avatar 405E. The subset can be obtained by filtering information corresponding to the user avatar 405E from other information that may be captured in the observation information. For example, the analytic system can capture information inside an observation region 415 and exclude information outside the observation region 415. The observation region 415 can be defined by the field of view of the observer avatar 405D extending up to predetermined range (e.g., three meters). Thus, the analytics system can capture images and sounds of a conversation between the user avatar 405E and entity 405A involving "buying a new car." Whereas the analytics system would exclude a conversation between entities 405B and 405C involving "coffee."

Using the information captured by the observer avatar 405D, the analytics system can determine segment information (e.g., segment information 159) describing the context of the observed information. As the present example involves a conversation in an upscale coffee shop, the segment information can include, "coffee," "luxury," "social," and "male 18-50." Additionally, terminology extracted from audio of the user avatar 405E's conversation can include "buy" "new," and "car." Further, based on the observation information and segment information, the analytics system can determine contextual segments (e.g., contextual segments 165) by classifying information using a predefined dictionary of contextual segments. In the present example, the contextual segments can describe classes, such as "consumer," "automobiles," and "social." The system can update a user profile corresponding to the target user to include the actions or behaviors by the target user avatar 405E. Based on the user profile, the analytic system can select advertisements for presenting to the user in the sub-environment 129 and present the selected advertisements to the target user. In the present example, the analytics system can select an advertisement for a new automobile consistent with the user profile and present the advertisement to the user via as an advertisement on the advertising object 409B in the shop.

F. Second Example of Determining Contextual Information in a Virtual Universe While the above example embodiment describes presenting advertisements to target users based on monitoring interactions in the virtual environment from a point of view of an observer avatar, other example embodiments present advertisements to target users based on monitoring interactions from the point of view of a user avatar. That is, some embodiments detect whether objects in the virtual universe are visible to an avatar of a target user. Based on the visibility of a first object and a profile of the target user, a monitoring application selects and presents advertising content in view of the user avatar to promote purchase activity by the target user. The system can present advertising to the target user without the user's avatar engaging in any conversation or interaction in the virtual environment.

More specifically, a system (e.g., analytics system 115) can instantiate a monitoring application (e.g., observer module 141) configured to detect and monitor entities (e.g., entities 405) and objects (e.g., advertising objects 409A, 409B) in a virtual environment (e.g., sub-environment 129). The monitor application can be, for example, a daemon executing on a computing system (e.g., metaverse server 120) executing a virtual reality environment (e.g., virtual environment).

Additionally, the monitoring application can identify an avatar of a target user as a target user avatar (See, e.g., FIG. 4, entity 405D). Identifying the target user avatar can include locating and tracking the position of the target user avatar in the virtual environment, as previously described above. (See, e.g., FIG. 3, block 313.) The monitoring application can also access metadata associated with the target user to determine that the target user is associated with a particular user profile (See, e.g., FIG. 2, user profiles 213 and FIG. 3, block 337.) The user profile can store information describing, for example, past actions, purchases, interests, and hobbies of the target user inside and/or outside the virtual environment.

The monitoring application can further monitor behavior of the target avatar in the virtual reality environment to determine visibility of objects to the target avatar and interactions with the objects by the target avatar. (See, e.g., FIG. 3, block 317). The determinations can be based on thresholds of time and distance for the visibility and or interaction. For example, if the first object remains at least partially visible in the target user avatar's visual field for more than five second at a range of less than three feet, then the monitoring application can determine that the user interacted with the first object. Additionally, if the user avatar virtually collides (e.g., touches) with the target object for a least five seconds, than the then the monitoring application can determine that the user interacted with the first object.

Responsive to determining that a particular three-dimensional object is at least partially visible to the target user avatar, the monitoring application can update a user profile of the target user. (See, e.g., FIG. 3, block 337.) The user profile can be updated to include the actions and behaviors of the target user avatar with respect to the virtual objects The system can select advertisements for presentation to the user based on the information in the user profile. (See, e.g., FIG. 3, block 325.) As described previously, the monitor can obtain segment information (e.g., segment information 159) from the virtual environment describing the context of the sub-environment. The system can present the selected advertisements to the target user. (See, e.g., FIG. 3, block 345.)

Presenting the advertisement to the target user can comprise presenting the advertisement within the virtual reality environment to the target user avatar, transmitting the advertisement to the metaverse application hosting the sub-environment for the application to present the advertisement, and using a second avatar to present the advertisement to the target user.

Referring back to the example illustrated in FIG. 4, the example the sub-environment 129 can be a virtualized representation of an upscale coffee shop at a ski resort, including virtual entities 405A, 405B, 405C, 405D, and 405E and virtual advertising objects 409A and 409B. The virtual entities 405A, 405B, 405C, and 405E can be avatars of other users or automatons and the entity 405D can be the target user avatar (e.g., user avatar 131). Additionally, the advertising objects 409A and 409B can be three-dimensional virtual objects, such as virtual billboards, posters, or other displays configured to display advertising as static images or video. The sub-environment 129 can include other virtual objects, such as objects 411A, 411B, and 411C, which can be a table, a mug, and skis, for example. One or more of the objects 411A, 411B, and 411C can also comprise display areas and skins configured to display advertising, such as branding and logos.

The monitoring application can identify and monitor the objects 409, 411 in relation to entity 405D as an avatar of a target user based on metadata. Monitoring can include tracking movements, collisions, interactions and behaviors of the target entity 405D in the sub-environment 129. The monitoring can also include determining respective visibility of the objects 409, 411 to the entity 405D. Based on the monitoring, the monitoring application can determine whether entity 405D has a line of sight to one or more of objects 409 and 411. As illustrated in FIG. 4, objects 409B, 411A, 411B, and 411C are visible to the target entity 405D, while object 409 is not. Responsive to detecting the visible objects 409B, 411A, 411B, and 411C, the system can update a user profile (e.g., user profiles 213) of the target user to log the visibility information. For instance, the system can record information associating the target user with the sub-environment 129, the visible objects 409B, 411A, 411B, and 411C and metadata thereof. Based on the update to the user profile, selecting content to promote purchase activity by the target user causing the content to be presented to the target user. The content can be presented in relation to the object.

Based on the user profile, the system can select content for display to the user on visible objects 409B, 411A, 411B, and 411C. (See, e.g., FIG. 3, blocks 329-341.) For example, the system can select a contextually targeted advertisement and present the advertisement on the billboard 409B. Additionally, the system can select and display branding on other objects. For example, the system can reskin the object 411C (skis) with colors and logos of a particular brand of skis.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
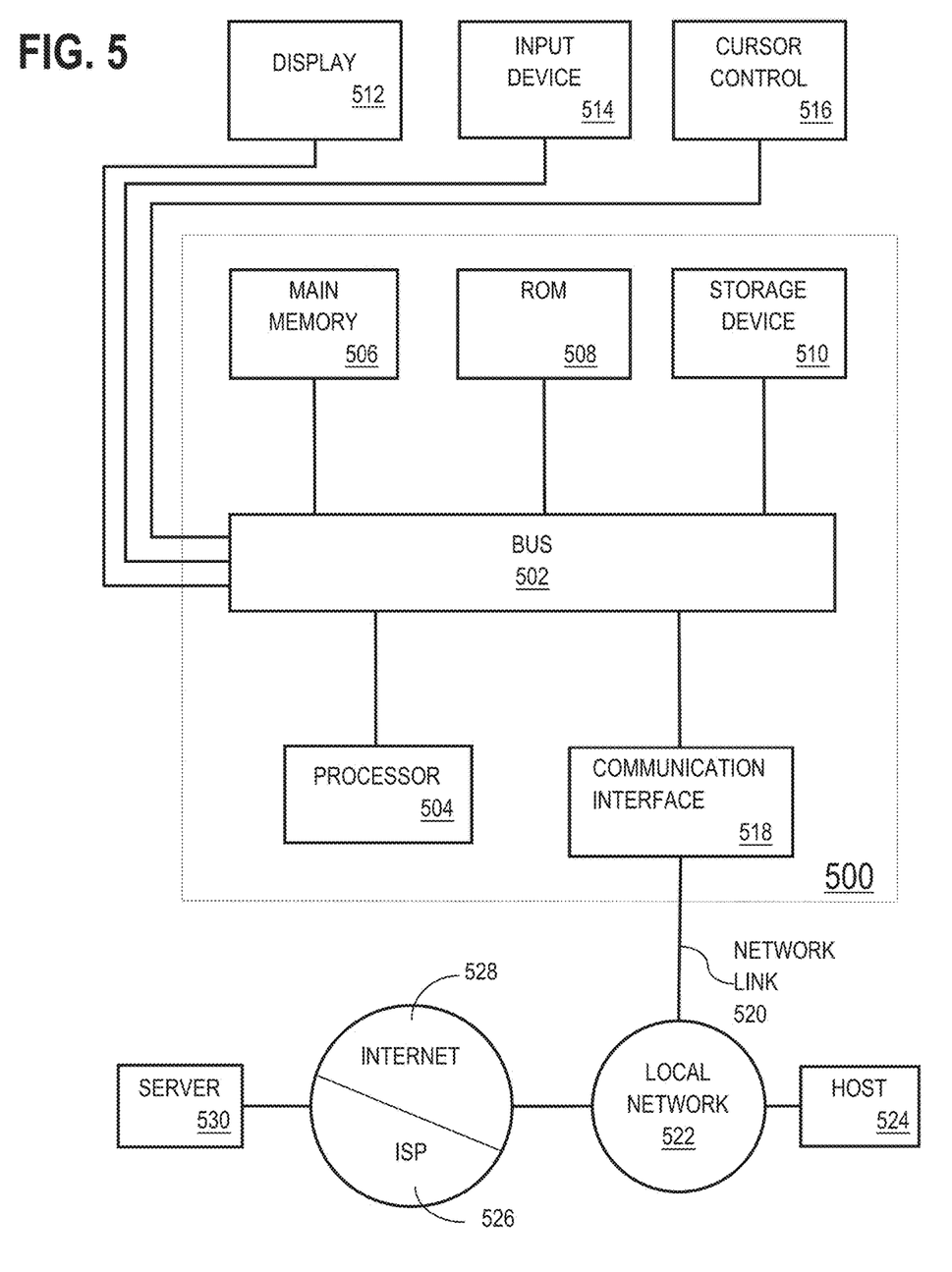
FIG. 5 shows a block diagram illustrating an example computer system in accordance with one or more embodiments.

For example, FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 enables two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

H. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    deploying, by a system-controlled monitor, an observer avatar in a virtual reality environment, wherein the system-controlled monitor controls the observer avatar to:
        detect one or more three-dimensional objects in the virtual reality environment, and
        detect visibility of the one or more three-dimensional objects to a plurality of avatars within the virtual reality environment;
    identifying, by the system-controlled monitor, a first avatar of the plurality of avatars in the virtual reality environment, wherein the first avatar is a virtual representation of a target user that controls the first avatar;
    determining that the target user is associated with a particular user profile by accessing metadata associated with the target user, wherein user profiles of users store information about (a) past actions taken by the users to engage in purchase activity or (b) interests in topics previously expressed by the users;
    determining, by the system-controlled monitor, visibility of a first three-dimensional object, of the one or more three-dimensional objects, to the first avatar at least by:
        monitoring, using the observer avatar, behavior of the first avatar in the virtual reality environment,
        wherein the behavior of the first avatar determined by the observer avatar includes information inside an observation region captured by the observer avatar and does not include information outside the observation region, and
        wherein the observation region comprises a field of view of the observer avatar in the virtual reality environment;
    responsive to determining that the first three-dimensional object was visible to the first avatar, updating the user profile corresponding to the target user;
    based on the update to the user profile, selecting content that promotes purchase activity by the target user; and
    causing the content to be presented to the target user.

2. The non-transitory computer readable medium of claim 1, wherein determining visibility comprises determining that the visibility of the first three-dimensional object to the first avatar satisfies a display criteria.

3. The non-transitory computer readable medium of claim 1, wherein determining visibility comprises:
    determining that interactions of the first avatar with the first three-dimensional object exceeds a threshold.

4. The non-transitory computer readable medium of claim 1, wherein the particular user profile comprises consumer activity by the target user outside of the virtual reality environment.

5. The non-transitory computer readable medium of claim 1 wherein:
    the first three-dimensional object is an object that the system-controlled monitor has detected is visible to a plurality of users, and
    the first three-dimensional object is selected from among a plurality of three-dimensional objects by a content provider based on metrics provided to the content provider about visibility of the plurality of three-dimensional objects to users including the plurality of users.

6. The non-transitory computer readable medium of claim 1, wherein the content is presented in relation to the first three-dimensional object.

7. The non-transitory computer readable medium of claim 1, wherein the operations further comprise:
    determining attributes of the target user based on the first avatar having visibility to the first three-dimensional object.

8. A method comprising:
    deploying, by a system-controlled monitor, an observer avatar in a virtual reality environment, wherein the system-controlled monitor controls the observer avatar to:
        detect one or more three-dimensional objects in the virtual reality environment, and
        detect visibility of the one or more three-dimensional objects to a plurality of avatars within the virtual reality environment;
    identifying, by the system-controlled monitor, a first avatar of the plurality of avatars in the virtual reality environment, wherein the first avatar is a virtual representation of a target user that controls the first avatar;
    determining that the target user is associated with a particular user profile by accessing metadata associated with the target user, wherein user profiles of users store information about (a) past actions taken by the users to engage in purchase activity or (b) interests in topics previously expressed by the users;

determining, by the system-controlled monitor, visibility of a first three-dimensional object, of the one or more three-dimensional objects, to the first avatar at least by:

monitoring, using the observer avatar, behavior of the first avatar in the virtual reality environment, wherein the behavior of the first avatar determined by the observer avatar includes information inside an observation region captured by the observer avatar and does not include information outside the observation region, and wherein the observation region comprises a field of view of the observer avatar in the virtual reality environment;

responsive to determining that the first three-dimensional object was visible to the first avatar, updating the user profile corresponding to the target user;

based on the update to the user profile, selecting content that promotes purchase activity by the target user; and causing the content to be presented to the target user.

9. The method of claim 8, wherein determining visibility comprises determining that the visibility of the first three-dimensional object to the first avatar satisfies a display criteria.

10. The method of claim 8, wherein determining visibility comprises:

determining that interactions of the first avatar with the first three-dimensional object exceeds a threshold.

11. The method of claim 8, wherein the particular user profile comprises consumer activity by the target user outside of the virtual reality environment.

12. The method of claim 8, wherein:

the first three-dimensional object is an object that the system-controlled monitor has detected is visible to a plurality of users, and the first three-dimensional object is selected from among a plurality of three-dimensional objects by a content provider based on metrics provided to the content provider about visibility of the plurality of three-dimensional objects to users including the plurality of users.

13. The method of claim 8, wherein the content is presented in relation to the first three-dimensional object.

14. The method of claim 8, further comprising:

determining attributes of the target user based on the first avatar having visibility to the first three-dimensional object.

15. A non-transitory computer readable medium comprising instructions which, when executed by one or more hardware processors, causes performance of operations comprising:

deploying, by a system-controlled monitor, an observer avatar in a virtual reality environment, wherein the system-controlled monitor controls the observer avatar to detect one or more three-dimensional objects in a region including a first avatar in the virtual reality environment;

identifying the first avatar in a virtual reality environment, the first avatar being a virtual representation of a target user and being controlled in the virtual reality environment by the target user;

monitoring, by the system-controlled monitor, behavior of the first avatar in the region of the virtual reality environment using the observer avatar, wherein:

the behavior of the first avatar determined by the observer avatar includes information inside an observation region captured by the observer avatar and does not include information outside the observation region, and the observation region comprises a field of view of the observer avatar in the virtual reality environment;

updating a user profile, corresponding to the target user, based on the region and behaviors by the first avatar in the virtual reality environment;

selecting an advertisement for presenting to the target user based on the user profile; and presenting the advertisement to the target user.

16. The non-transitory computer readable medium of claim 15, wherein the operations further comprise:

determining visibility of a first three-dimensional object, of the one or more three-dimensional objects, to the first avatar by monitoring, by the system-controlled monitor, behavior of the first avatar in the virtual reality environment.

17. The non-transitory computer readable medium of claim 16, wherein determining visibility comprises determining the visibility of the first three-dimensional object to the first avatar satisfies a display criteria.

18. The non-transitory computer readable medium of claim 15, wherein selecting the advertisement comprises:

determining that interactions of the first avatar with a first three-dimensional object exceeds a threshold.

19. The non-transitory computer readable medium of claim 15, wherein the user profile comprises consumer activity by the target user outside of the virtual reality environment.

20. The non-transitory computer readable medium of claim 15 wherein:

a first three-dimensional object, of the one or more three-dimensional objects, is an object that the system-controlled monitor has detected is visible to a plurality of users, and the first three-dimensional object is selected from among a plurality of three-dimensional objects by a content provider based on metrics provided to the content provider about visibility of the plurality of three-dimensional objects to users including the plurality of users.

21. The non-transitory computer readable medium of claim 15, wherein the advertisement is presented in relation to the first three-dimensional object.

22. The non-transitory computer readable medium of claim 15, wherein the operations further comprise:

determining attributes of the target user based on the first avatar having visibility to the first three-dimensional object.

23. A method comprising:

deploying, by a system-controlled monitor, an observer avatar in a virtual reality environment, wherein the system-controlled monitor controls the observer avatar to detect one or more three-dimensional objects in a region including a first avatar in the virtual reality environment;

identifying the first avatar in a virtual reality environment, the first avatar being a virtual representation of a target user and being controlled in the virtual reality environment by the target user;

monitoring, by the system-controlled monitor, behavior of the first avatar in the region of the virtual reality environment using the observer avatar, wherein:

the behavior of the first avatar determined by the observer avatar includes information inside an observation region captured by the observer avatar and does not include information outside the observation region, and the observation region comprises a field of view of the observer avatar in the virtual reality environment;

updating a user profile, corresponding to the target user, based on the region and behaviors by the first avatar in the virtual reality environment;

selecting an advertisement for presenting to the target user based on the user profile; and presenting the advertisement to the target user.

24. The method of claim 23, further comprising:

determining visibility of a first three-dimensional object, of the one or more three-dimensional objects, to the first avatar by monitoring, by the system-controlled monitor, behavior of the first avatar in the virtual reality environment.

25. The method of claim 23, wherein selecting the advertisement comprises:

determining that interactions of the first avatar with a first three-dimensional object exceeds a threshold.

26. The method of claim 23, wherein:

a first three-dimensional object, of the one or more three-dimensional objects, is an object that the system-controlled monitor has detected is visible to a plurality of users, and the first three-dimensional object is selected from among a plurality of three-dimensional objects by a content provider based on metrics provided to the content provider about visibility of the plurality of three-dimensional objects to users including the plurality of users.

* * * * *

UNITED STATES PATENT AND TRADEMARK OFFICE
CERTIFICATE OF CORRECTION

| | | |
|---|---|---|
| PATENT NO. | : 12,154,139 B2 | Page 1 of 1 |
| APPLICATION NO. | : 18/310930 | |
| DATED | : November 26, 2024 | |
| INVENTOR(S) | : Canney et al. | |

It is certified that error appears in the above-identified patent and that said Letters Patent is hereby corrected as shown below:

In the Specification

In Column 7, Line 1, delete "thercon" and insert -- thereon --, therefor.

Signed and Sealed this
First Day of April, 2025

Coke Morgan Stewart
*Acting Director of the United States Patent and Trademark Office*